Sept. 9, 1924.  
J. F. O'CONNOR  
1,508,118  
FRICTION SHOCK ABSORBING MECHANISM  
Original Filed Sept. 8, 1921    2 Sheets-Sheet 1
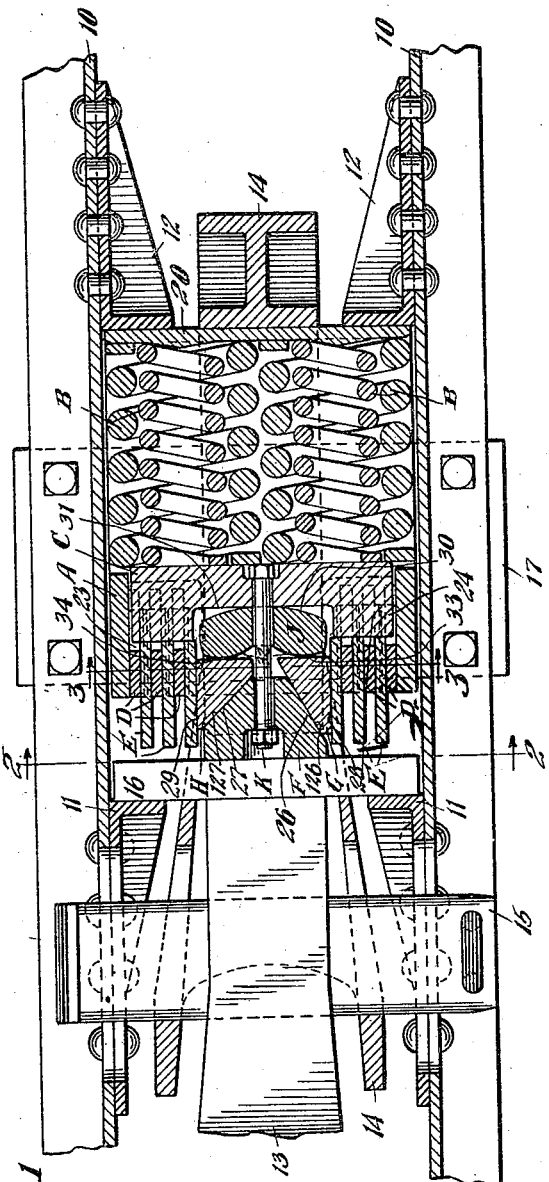
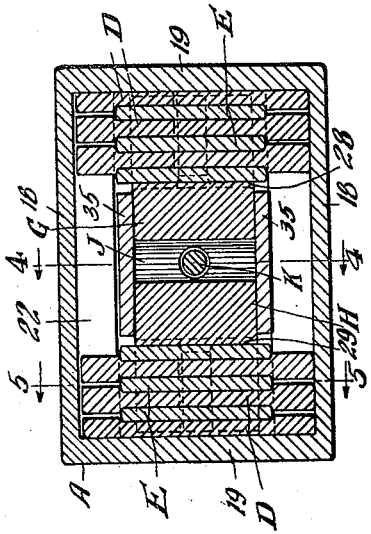
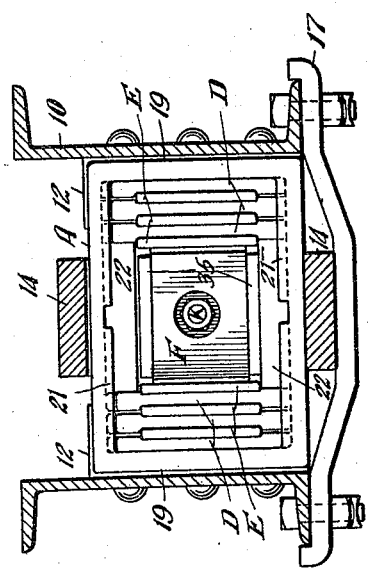
Witnesses  
Wm. Geiger
Inventor  
John F. O'Connor  
By Geo. I. Haight  
His Atty.

Sept. 9, 1924.  
J. F. O'CONNOR  
1,508,118

FRICTION SHOCK ABSORBING MECHANISM

Original Filed Sept. 8, 1921    2 Sheets-Sheet 2

Witnesses  
Wm. Geiger

Inventor  
John F. O'Connor  
By Geo. I. Haight  
His Atty.

Patented Sept. 9, 1924.

1,508,118

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed September 8, 1921, Serial No. 499,207. Renewed April 10, 1924.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high-capacity friction shock absorbing mechanism especially adapted for railway draft riggings and wherein are provided large frictional wearing areas, to the end that the pressure per unit of frictional area may be maintained at a relatively low figure.

Another object of the invention is to provide a mechanism of the character indicated of that type employing intercalated friction elements, the mechanism being so arranged that certain release is obtained and without the aid of anti-friction rollers, anti-friction pads or other relatively expensive expedients and more especially by employing a wedging system consisting of few parts of the simplest construction and form with regard to manufacture.

A specific object of the invention is to provide a friction shock absorbing mechanism of the intercalated friction plate type in which is employed a wedging system or lateral-pressure-creating system that utilizes certain cooperating faces on the elements some of which have a true wedge-action and some a non-wedge action during the compression stroke with a converse action during the release of the mechanism, thereby allowing of high-capacity with certain release.

Figure 4:
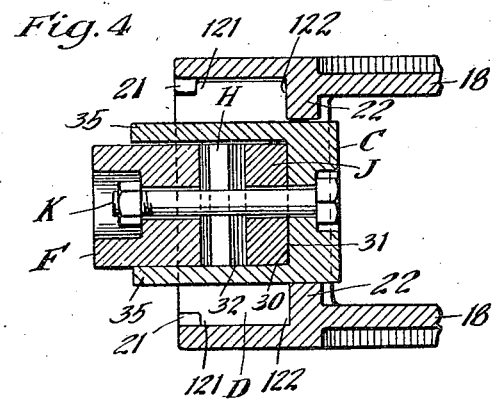
Figure 5:
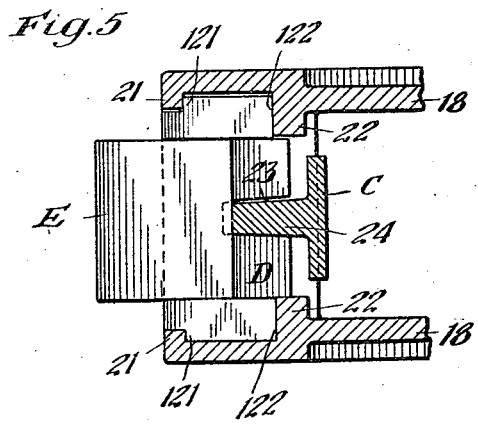

In the drawings forming a part of this specification, Figure 1 is a horizontal longitudinal sectional view of a portion of a railway draft rigging showing my improvements in connection therewith. Fig. 2 is a vertical transverse sectional view corresponding substantially to the line 2—2 of Fig. 1. Fig. 3 is an enlarged vertical transverse sectional view of the shock absorbing mechanism proper taken on the line 3—3 of Fig. 1. Figs. 4 and 5 are broken vertical longitudinal sectional views corresponding with the section lines 4—4 and 5—5, respectively of Fig. 3. And Figs. 6, 7, 8, 9 and 10 are detail perspectives of one of the stationary friction plates, the spring follower, the pressure-transmitting wedge block, one of the shoes and the compensating rocker, respectively.

In said drawings, 10—10 denote channel draft sills of a railway car to the inner faces of which are secured front stop lugs 11—11 and rear stop lugs 12—12. A portion of a draw-bar is indicated at 13, the same being operatively associated with the shock absorbing mechanism proper by a hooded cast yoke 14 and coupler key 15. The shock absorbing mechanism proper and a front follower 16 are disposed within the yoke, all of the parts being supported in operative position by a detachable saddle plate 17.

The improved shock absorbing mechanism proper, as shown, comprises, a casting A which may be variously termed the shell, follower-acting member, column-load-sustaining member; twin-arranged springs B—B; a spring follower C; a series of relatively stationary friction plates D—D; a series of relatively movable friction plates E—E; a pressure-transmitting wedge F; a wedge-friction-shoe G; a shoe H; a compensating rocker J; and a retainer bolt K.

The casting A is formed with upper and lower horizontal walls 18—18, side walls 19—19 and rear vertical connecting wall 20. The side walls 19 are left relatively short so as to provide lateral openings to permit insertion and removal of certain of the parts during assembling and disassembling. The rear wall 20 cooperates with the stop lugs 12 in the manner of an ordinary rear follower.

The main springs B—B are of well-known form, each preferably comprising an outer heavy coil and an inner-nested-lighter coil. Said springs bear at their rear ends against the wall 20 and at their forward ends against the follower C.

It will be noted that the forward or front end of the casting A provides a hollow rectangular box-like shell. The latter is formed on the inner side thereof with upper and lower vertically alined transversely extending ribs 21—21 and 22—22. Said ribs 21 and 22 form the anchoring means for the plurality of stationary friction plates D, the latter being suitably shouldered or notched on their thickened upper and lower edges as indicated at 121 and 122 to cooperate with the corresponding shoulders provided by the ribs 21 and 22. While the plates D are held against longitudinal movement with respect to the casting A, they are, nevertheless, freely responsive to laterally applied pressure.

The movable friction plates E are preferably of rectangular plate-like form and are alternated with the stationary plates D. As clearly shown in Fig. 3, the plates D are channeled or grooved on their sides so as to provide suitable guides for the movable plates E.

Figure 6:
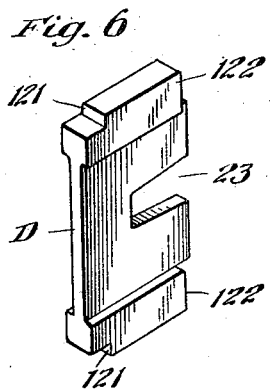

As shown in Figs. 1, 5 and 6, the stationary plates D are recessed forwardly from their inner edges as indicated at 23. Said recesses are made to accommodate forwardly extending heavy ribs 24—24 on the opposite sides of the center of the spring follower D so that I am enabled to have the inner ends of the movable plates E normally disposed intermediate the length of the stationary plates D, and at the same time allow the spring follower C to engage the movable plates in pushing them out to normal position during release.

The series of stationary and movable plates are preferably divided into two laterally separated groups, so as to leave a central space for the accommodation of the wedging system. The latter, as shown, comprises the elements F, G, H and J. The pressure-transmitting wedge F is formed on the outer side thereof with a flat bearing face 25 which engages with the inner face of the follower 16. On its inner side, the wedge F is formed with a true wedge face 26 on one side which extends at a relatively acute angle with respect to the axis of the mechanism and forces applied parallel to the center line of draft. On the side opposite to the wedge face 26, the wedge F is formed with another flat face 27 which extends at a relatively blunt angle with respect to the center line of the mechanism and forces applied parallel thereto.

The wedge-shoe G is formed on the outer side thereof with a longitudinally extending face 28 engageable with and slidable on the inner face of the adjacent movable plate E. On its inner side, the wedge-shoe G is formed with a true wedge face 126 extending at the same angle as and cooperable with the wedge face 26.

The shoe H is formed on its outer side with a face 29 slidable on the inner face of the corresponding adjacent movable plate E. On its inner side, said shoe H is formed with an inclined face 127 extending at the same angle as and cooperable with the face 27 of the wedge F.

The compensating rocker J is formed on its inner side with an arcuate or cylindrical face 30 adapting it to adjust itself by rocking or tilting on the central bearing face 31 on the forward side of the follower C. On its forward side, the rocker J is formed with two symmetrically disposed convex faces 32—32, one on each side of the center line, the same being adapted to engage with the transverse faces 33 and 34 of the elements G and H to allow for rocking or tilting slightly with respect thereto.

Figure 7:
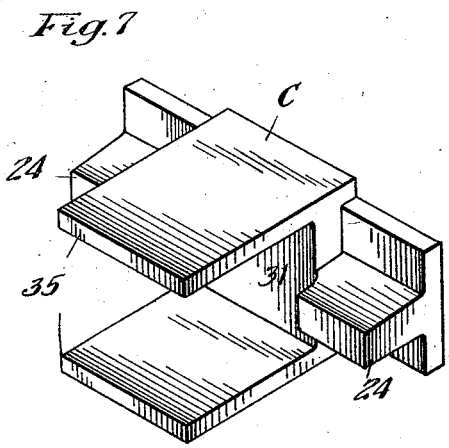
Figure 8:
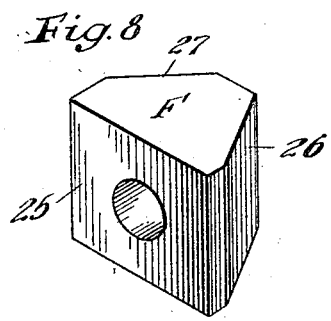
Figure 9:
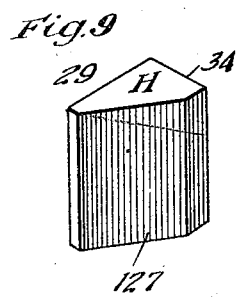
Figure 10:
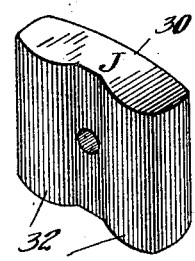

All of the elements of the wedge system are held in proper position vertically preferably by means of upper and lower forwardly extended horizontal flanges 35—35 on the follower C which straddle the elements of the wedging system as best shown in Figs. 3 and 7.

The parts are held in assembled relation preferably by the retainer bolt K which is anchored at its rear end in a suitable socket in the follower C and at its forward end in a suitable socket in the wedge F. The follower and wedge and rocker J are suitably apertured to accommodate the shank of the bolt.

In carrying out my invention, the casting A will preferably be made of malleable iron which, as is well known, possesses a certain amount of elasticity and I make use of this factor in carrying out my invention. As heretofore described, the wedge faces 26 and 126 extend at an acute angle with respect to the axis of the mechanism whereas the faces 27 and 127 extend at a relatively blunt angle with respect to said axis. In actual practice, the wedge faces 26 and 126 will be made sufficiently acute as to function in the ordinary manner of true wedge faces and to produce the necessary or desirable lateral pressure or wedging action, with respect to forces applied parallel to the center line of the mechanism. On the contrary, the faces 27 and 127 will be made to extend at such a blunt angle with respect to forces applied parallel to the center line of the mechanism that they will not function as wedging faces, but, on the contrary, will be prevented from slipping on each other, thereby producing, in effect, a "freezing" of the wedge F and the shoe H, under such conditions. The angle of the faces 27 and 127 will, of course, vary greatly in accordance with the metals employed in the elements F and H but will be dependent upon the known coefficient of friction between the metals employed in said two elements. With this arrangement, it will, therefore, be seen that in compression, under forces applied parallel to the center line of the mechanism, the wedging effect will be the same as produced by the wedge-shoe G cooperating with another wedge member which combines the two elements F and H.

The slight relative longitudinal movement which occurs between the wedge-shoe G on the one hand, and the combined wedge F—H on the other hand, during compression, will be compensated for with respect to the resistance from the springs B and the pressure thereon equalized by the rocker J adjusting itself on the follower C, as will be obvious.

As shown in Fig. 1, there is normally a slight space, preferably one-half inch between the front follower 16 and the front ends of the movable plates E. When force is applied to compress the mechanism, as under buff, the follower 16 will move inwardly together with the wedging system for an amount equal to said space of approximately one-half inch without actuation of the intercalated plates. This will remove the spring follower C from engagement with the movable plates and will set up the desired lateral pressure or wedging action to increase the friction between the plates. As will be evident, to those skilled in the art, the degree of wedging action thus set up may be regulated by the distance which the wedging system is allowed to move independently of the movable plates. After the follower 16 engages with the movable plates, the latter and the wedging system will move inwardly simultaneously, thus augmenting the capacity by the friction generated between the movable and stationary plates.

As the lateral pressure or wedging-action is exerted during compression, it is evident that a certain amount of expansion will take place laterally in the shell portion of the casting A and there will also be some slight amount of compression, due to elasticity, in the stationary and movable plates. This action obviously will set up tension forces in the plates and shell which, upon removal of the actuating force from the drawbar, will automatically and instantaneously react laterally or radially inwardly, that is, at right angles to the center line of the mechanism and the compression-acting forces. With respect to such radially inwardly exerted forces, it will be evident that the faces 26 and 126 will extend at a blunt and non-wedge-acting angle whereas the faces 27 and 127 will become wedge faces and the collapse of the wedging system will, therefore, take place between the elements F and H. The lateral pressure on the plates is thus automatically and substantially instantaneously reduced so as to allow the springs B to project the wedging system outwardly, which action will continue independently of any movement of the plates E until the follower C, through the ribs 24 thereof, engages the inner edges of the plates E and thereafter project the latter outwardly, thus restoring all of the parts to their original normal position.

I am aware that it is old in the art to employ intercalated friction plates in a shock absorbing mechanism, in combination with wedges of different characters. However, so far as I know, no such mechanism has heretofore proven commercially practical except special means, in the form of anti-friction rollers or specially arranged anti-friction pads or complicated differential wedges have been employed in the wedging system to effect release. With my construction, I am enabled to obtain any desired capacity by varying the angles of the faces 26 and 126 and at the same time insure release by a system of wedges, each of which is of the simplest construction as regards economy of manufacture, finishing, assembling and maintenance.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a column-load-sustaining member; of a plurality of relatively stationary friction elements anchored to said member against movement longitudinally thereof but responsive to transversely applied pressure; a plurality of relatively longitudinally movable friction elements intercalated with said stationary elements; a spring resistance; and a pressure-transmitting and transverse-pressure-creating system cooperable with said intercalated friction elements, said system including, a plurality of cooperable wedge elements having cooperating sets of faces, certain of which are inclined at a wedge-acting angle and certain at a non-wedge-acting angle with respect to actuating forces applied substantially parallel to the line of movement of the wedge system relatively to said member and one of said elements being provided with both wedge acting and non-wedge-acting faces and being adapted to receive the actuating forces, said sets of faces on the wedge elements acting reversely during release under forces exerted transversely from the intercalated friction elements.

2. In a friction shock absorbing mechanism, the combination with a column-load-sustaining member; of a plurality of relatively stationary friction elements anchored to said member against movement longitudinally thereof but responsive to transversely applied pressure; a plurality of relatively longitudinally movable friction elements intercalated with said stationary elements; a spring resistance; and a pressure-transmitting and transverse-pressure-creating system cooperable with said intercalated friction elements, said system including, a wedge element adapted to receive the actuating force, a second wedge element and a third element, said first and second named wedge elements having cooperating faces inclined at a relatively acute angle with respect to actuating forces applied substantially parallel to the axis of the mechanism, and said first named wedge element and third named element having cooperating faces inclined at a relatively blunt, non-wedge-acting angle with respect to similarly applied forces.

3. In a friction shock absorbing mechanism, the combination with a column-load-sustaining member; of a plurality of relatively stationary friction plates anchored to said member against movement longitudinally thereof but responsive to laterally applied pressure; a plurality of relatively longitudinally movable friction plates intercalated with said stationary plates, the outer ends of said movable plates being normally extended outwardly beyond the stationary plates, said intercalated plates being divided into two separate groups; a spring resistance; and a pressure-transmitting and transverse-pressure-creating system disposed between said two groups of plates and cooperable therewith, said system including, a wedge element adapted to receive the actuating forces, a second wedge element and a third element, said first and second named wedge elements having cooperable faces, inclined at a relatively acute angle with respect to actuating forces applied substantially parallel to the center line of the mechanism and said first named wedge element and said third element having cooperable faces inclined at a relatively blunt non-wedge-acting angle with respect to similarly applied forces.

4. In a friction shock absorbing mechanism, the combination with a column-load-sustaining member; of a plurality of relatively stationary friction plates anchored to said member against movement longitudinally thereof but responsive to laterally applied pressure; a plurality of relatively longitudinally movable friction plates intercalated with said stationary plates, the outer ends of said movable plates being normally extended outwardly beyond the stationary plates, said intercalated plates being divided into two separate groups; a spring resistance; a pressure-transmitting and transverse-pressure-creating system disposed between two groups of plates and cooperable therewith, said system including, a plurality of cooperable wedge elements, one of which is adapted to receive the actuating force, said elements having cooperable sets of faces, certain of which are inclined at a wedge-acting angle and certain at a non-wedge-acting angle with respect to actuating forces applied substantially parallel to the line of movement of the wedge system relatively to said member, said sets of faces on the said elements acting reversely during release under forces exerted transversely inwardly from the groups of friction plates; a spring follower interposed between said groups of plates and the spring resistance; and spring-pressure-equalizing means interposed between elements of the wedging system and said spring follower.

5. In a friction shock absorbing mechanism, the combination with a column-load-sustaining member; of a plurality of relatively stationary friction plates anchored to said member against movement longitudinally thereof but responsive to laterally applied pressure; a plurality of relatively longitudinally movable friction plates intercalated with said stationary plates, the outer ends of said movable plates being normally extended outwardly beyond the stationary plates, said intercalated plates being divided into two separate groups; a spring resistance; a pressure-transmitting and transverse-pressure-creating system disposed between said two groups of plates and cooperable therewith, said system including, a wedge element adapted to receive the actuating forces, a second wedge element and a third element, said first and second named wedge elements having cooperable faces, inclined at a relatively acute angle with respect to actuating forces applied substantially parallel to the center line of the mechanism and said first named wedge element and said third element having cooperable faces inclined at a relatively blunt non-wedge-acting angle with respect to similarly applied forces; a spring follower disposed between the groups of friction plates and the spring resistance; and spring-pressure-equalizing means interposed between said second and third named elements of the wedge system and said spring follower.

6. In a friction shock absorbing mechanism, the combination with a column-load-sustaining member; of a plurality of relatively stationary friction plates anchored to said member against movement longitudinally thereof but responsive to laterally applied pressure; a plurality of relatively longitudinally movable friction plates intercalated with said stationary plates, the outer ends of said movable plates being normally extended outwardly beyond the stationary plates, said intercalated plates being divided into two separate groups; a spring resistance; a pressure-transmitting and transverse-pressure-creating system disposed between said two groups of plates and cooperable therewith, said system including, a wedge element adapted to receive the actuating forces, a second wedge element and a third element, said first and second named wedge elements having cooperable faces, inclined at relatively acute angle with respect to actuating forces applied substantially parallel to the center line of the mechanism and said first named wedge element and said third element having cooperable faces inclined at a relatively blunt non-wedge-acting angle with respect to similarly applied forces; a spring follower interposed between the friction plates and the spring resistance; and an equalizing rocker interposed between said second and third named elements of the wedge system and said spring follower.

7. In a friction shock absorbing mechanism, the combination with a column-load-sustaining member; of a plurality of relatively stationary friction plates anchored to said member against movement longitudinally thereof but responsive to laterally applied pressure; a plurality of relatively longitudinally movable friction plates intercalated with said stationary plates, the outer ends of said movable plates being normally extended outwardly beyond the stationary plates, said intercalated plates being divided into two separate groups; a spring resistance; a pressure-transmitting and transverse-pressure-creating system disposed between said two goups of plates and cooperable therewith, said system including, a wedge element adapted to receive the actuating forces, a second wedge element and a third element, said first and second named wedge elements having cooperable faces, inclined at a relatively acute angle with respect to actuating forces applied substantially parallel to the center line of the mechanism and said first named wedge element and said third element having cooperable faces inclined at a relatively blunt non-wedge-acting angle with respect to similarly applied forces; an outer follower normally spaced a limited distance from the outer ends of said movable plates and with which said first named wedge element is in contact; a spring follower interposed between the inner ends of the movable friction plates and the spring resistance normally engaged with the inner ends of said movable plates; and an equalizing rocker bearing upon said spring follower on one side and on the inner ends of said second and third named elements of the wedge system on its other side.

8. In a friction shock absorbing mechanism; the combination with a column-load-sustaining member; of a spring resistance; a pressure transmitting and pressure-creating system, cooperable with said column-load-sustaining member said system including, a wedge element adapted to receive the actuating forces, a second wedge element and a third wedge element, said first and second wedge elements having cooperable faces inclined at a relatively acute angle with respect to actuating forces applied substantially parallel to the center line of the mechanism and said first and third named wedge elements having cooperable faces inclined at a relatively blunt non-wedge-acting angle with respect to similarly applied forces; a spring follower co-operating with said spring resistance; and an equalizing rocker interposed between said second and third named elements of the wedge system and said spring follower.

9. In a friction shock absorbing mechanism; the combination with a column-load-sustaining member; of a spring resistance; a pressure transmitting and transverse pressure creating system cooperable with said column member, said system including, a plurality of cooperable wedge elements, one of which is adapted to receive the actuating force, said elements having cooperable sets of faces, certain of which are inclined at at a wedge acting angle and certain at a non-wedge acting angle with respect to the actuating forces applied substantially parallel to the line of movement of the wedge system relatively to said member, said sets of faces on the said elements acting reversely during release under forces exerted transversely inwardly from the column member; a spring follower co-operating with said spring resistance; and spring pressure equalizing means interposed between elements of the wedging system and said spring follower.

10. In a friction shock absorbing mechanism the combination with a column-load-sustaining member; of a spring resistance; a pressure transmitting and transverse pressure creating system co-operable with said column-load-sustaining member, said system including a wedge element adapted to receive the actuating forces, a second wedge element, and a third wedge element, said first and second wedge elements having co-operable faces inclined at a relatively acute wedging angle with respect to the actuating forces applied substantially parallel to the center line of the mechanism, and said first and third named wedge elements having co-operable faces inclined at a relatively blunt releasing angle with respect to similarly applied forces; and an equalizing rocker interposed between said second and third named elements of the wedge system and said spring resistance.

In witness that I claim the foregoing I have hereunto subscribed my name this 31st day of August, 1921.

JOHN F. O'CONNOR.

Witnesses:
CARRIE GAILING,
UNA C. PERIN.